US006031956A

United States Patent [19]
Li et al.

[11] Patent Number: 6,031,956
[45] Date of Patent: Feb. 29, 2000

[54] HIGH PERFORMANCE SINGLE MODE WAVEGUIDE

[75] Inventors: Ming-Jun Li; Yanming Liu, both of Horseheads, N.Y.; Daiping Ma; David K. Smith, both of Wilmington, N.C.

[73] Assignee: Corning Incorporated, Corning, N.Y.

[21] Appl. No.: 09/173,097

[22] Filed: Oct. 14, 1998

Related U.S. Application Data

[60] Provisional application No. 60/065,845, Nov. 17, 1997.

[51] Int. Cl.[7] ....................................... G02B 6/02
[52] U.S. Cl. .......................... 385/124; 385/123; 385/126; 385/127; 385/141
[58] Field of Search ..................................... 385/123, 124, 385/125, 126, 127, 128, 141

[56] References Cited

U.S. PATENT DOCUMENTS

| | | | |
|---|---|---|---|
| 4,715,679 | 12/1987 | Bhagavatula | 385/123 X |
| 4,755,022 | 7/1988 | Ohashi et al. | 385/127 |
| 4,877,304 | 10/1989 | Bhagavatula | 385/124 X |
| 5,278,931 | 1/1994 | Antos et al. | 385/126 |
| 5,361,319 | 11/1994 | Antos et al. | 385/123 |
| 5,483,612 | 1/1996 | Gallagher et al. | 385/127 |
| 5,649,044 | 7/1997 | Bhagavatula | 385/124 |
| 5,684,909 | 11/1997 | Liu | 385/127 |
| 5,715,346 | 2/1998 | Liu | 385/124 |
| 5,721,800 | 2/1998 | Kato et al. | 385/127 |
| 5,732,178 | 3/1998 | Terasawa et al. | 385/127 |
| 5,748,824 | 5/1998 | Smith | 385/124 |
| 5,822,488 | 10/1998 | Terasawa et al. | 385/127 |
| 5,835,655 | 11/1998 | Liu et al. | 385/124 |
| 5,852,701 | 12/1998 | Kato et al. | 385/127 |

*Primary Examiner*—Brian Healy
*Attorney, Agent, or Firm*—William J. Chervenak

[57] ABSTRACT

Disclosed is a single mode optical waveguide fiber having a segmented core design. In particular, the core comprises three segments, each having characteristic dimensions and refractive index profile. By proper choice of index profile in each segment, a waveguide fiber is made which has a mode field diameter of about 9.5, low, positive total dispersion over the operating window 1530 nm to 1565 nm as well as effective area greater than 60 $\mu m^2$.

8 Claims, 2 Drawing Sheets

HIGH PERFORMANCE SINGLE MODE WAVEGUIDE

This application is based upon the provisional application Ser. No. 60/065,845, filed Nov. 17, 1997, pending, which we claim as the priority date of this application.

BACKGROUND OF THE INVENTION

The invention relates to a single mode optical waveguide fiber having a segmented core design which provides for high performance in the operating window around 1550 nm. In particular, effective area is large, the zero dispersion wavelength is outside the operating window, and total dispersion is positive over the operating window.

A waveguide having large effective area reduces non-linear optical effects, including self phase modulation, four wave mixing, cross phase modulation, and non-linear scattering processes, which can cause degradation of signals in high power systems. In general, a mathematical description of these non-linear effects includes the ratio, $P/A_{eff}$, where P is optical power. For example, a non-linear optical effect usually follows an equation containing a term, $\exp[P \times L_{eff}/A_{eff}]$, where $L_{eff}$ is effective length. Thus, an increase in $A_{eff}$ produces a decrease in the non-linear contribution to the degradation of a light signal.

The requirement in the telecommunication industry for greater information capacity over long distances, without regenerators, has led to a reevaluation of single mode fiber index profile design.

The focus of this reevaluation has been to provide optical waveguides which:
- reduce non-linear effects such as those noted above;
- are optimized for the lower attenuation operating wavelength range around 1550 nm;
- are compatible with optical amplifiers; and,
- retain the desirable properties of optical waveguides such as high strength, fatigue resistance, and bend resistance.

A waveguide fiber, having at least two distinct refractive index segments was found to have sufficient flexibility to meet and exceed the criteria for a high performance waveguide fiber system. The genera of segmented core designs are disclosed in detail in U.S. Pat. No. 4,715,679, Bhagavatula. Species of the profiles disclosed in the '679 patent, having properties especially suited for particular high performance telecommunications systems, are disclosed in U.S. Pat. No. 5,483,612, Gallagher et al.(the '612 patent).

The present invention is yet another core index profile species, closely related to the profiles set forth in the '612 patent, which reduces non-linear effects and which is particularly suited to transmission of high power signals over long distances without regeneration. The definition of high power and long distance is meaningful only in the context of a particular telecommunication system wherein a bit rate, a bit error rate, a multiplexing scheme, and perhaps optical amplifiers are specified. There are additional factors, known to those skilled in the art, which have impact upon the meaning of high power and long distance. However, for most purposes, high power is an optical power greater than about 10 mw. For example, a long distance is one in which the distance between electronic regenerators can be in excess of 100 km.

Considering the Kerr non-linearities, i.e., self phase modulation, cross phase modulation and four wave mixing, the benefit of large $A_{eff}$ can be shown from the equation for refractive index. The refractive index of silica based optical waveguide fiber is known to be non-linear with respect to the light electric field. The refractive index may be written as, $$n = n_0 + n_2 P/A_{eff},$$

where $n_0$ is the linear refractive index, $n_2$ is the non-linear index coefficient, P is light power transmitted along the waveguide and $A_{eff}$ is the effective area of the waveguide fiber. Because $n_2$ is a constant of the material, increase in $A_{eff}$ is essentially the only means for reducing the non-linear contribution to the refractive index, thereby reducing the impact of Kerr type non-linearities.

Thus there is a need for an optical waveguide fiber designed to have a large effective area. The window of operation of greatest interest at this time is that near 1550 nm. In addition, to further minimize four wave mixing effects, the total dispersion does not pass through zero over the range of operating wavelengths. In fact, the total dispersion remains positive over the operating window so that self phase modulation may cancel with the linear dispersion, a configuration required in soliton communication systems.

Definitions

The following definitions are in accord with common usage in the art.

The radii of the segments of the core are defined in terms of the index of refraction. A particular region has a first and a last refractive index point. The radius from the waveguide centerline to the location of this first refractive index point is the inner radius of the core region or segment. Likewise, the radius from the waveguide centerline to the location of the last refractive index point is the outer radius of the core segment.

Unless specifically noted otherwise in the text, the radii of the index profile segments discussed here are conveniently defined as follows, where the reference is to a chart of $\Delta\%$ vs waveguide radius:
- radius of the central core segment is measured from the axial centerline of the waveguide to the intersection of the extrapolated central index profile with the x axis;
- radius of the second annular segment is measured from the axial centerline of the waveguide to the center of the baseline of the second annulus;
- the width of the second annular region is the distance between parallel lines drawn from the half maximum refractive index points of the index profile to the x axis; and,
- radius of the first annular segment is measured from the axial centerline of the waveguide to the first half maximum point of the second annular segment.

The effective area is $$A_{eff} = 2\pi (\int E^2\, r\, dr)^2 / (\int E^4\, r\, dr),$$

where the integration limits are 0 to $\infty$, and E is the electric field associated with the propagated light. An effective diameter, $D_{eff}$, may be defined as, $$A_{eff} = \pi (D_{eff}/2)^2.$$

The relative index, $\Delta\%$, is defined by the equation, $$\Delta\%\ 100 \times (n_1^2 - n_2^2)/2n_1^2,$$

where $n_1$ is the maximum refractive index of the index profile segment 1, and $n_2$ is the refractive index in the reference region which is usually taken to be the minimum index of the clad layer.

For the particular segmented profile described in this application, the first segment and the second annular segment $\Delta\%$ will refer to the maximum relative index of the segments. The $\Delta\%$ of the first annular segment will refer to the minimum relative index of that segment.

The term refractive index profile or simply index profile is the relation between $\Delta\%$ or refractive index and radius over a selected portion of the core. The term alpha profile refers to a refractive index profile which follows the equation, $$n(r)=n_0(1-\Delta[r/a]^\alpha)$$

where r is core radius, $\Delta$ is defined above, a is the last point in the profile, r is chosen to be zero at the first point of the profile, and $\alpha$ is an exponent which defines the profile shape. Other index profiles include a step index, a trapezoidal index and a rounded step index, in which the rounding is due to dopant diffusion in regions of rapid refractive index change.

The profile volume is defined as $2\int_{r1}^{r2} (\Delta\% \ r \ dr)$. The inner profile volume extends from the waveguide centerline, r=0, to the crossover radius. The outer profile volume extends from the cross over radius to the last point of the core. The units of the profile volume are $\% \ \mu m^2$ because relative index is dimensionless.

The crossover radius is found from the dependence of power distribution in the signal as signal wavelength changes. Over the inner volume, signal power decreases as wavelength increases. Over the outer volume, signal power increases as wavelength increases.

Total dispersion is defined as the algebraic sum of waveguide dispersion and material dispersion. Total dispersion is sometimes called chromatic dispersion in the art. The units of total dispersion are ps/nm-km.

The bend resistance of a waveguide fiber is expressed as induced attenuation under prescribed test conditions. A bend test referenced herein is the pin array bend test which is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

Another bend test referenced herein the lateral load test. In this test a prescribed length of waveguide fiber is placed between two flat plates. A #70 wire mesh is attached to one of the plates. A known length of waveguide fiber is sandwiched between the plates and a reference attenuation is established by pressing the plates together with a force of 30 newtons. A 70 newton force is then applied to the plates and the induced attenuation in dB/m is measured.

SUMMARY OF THE INVENTION

The present invention meets a unique set of requirements for a class of high performance telecommunication systems by providing:

low total dispersion over a preselected wavelength operating range;

low attenuation at 1550 nm;

large effective area;

large mode field diameter;

a zero dispersion wavelength outside the range of operating wavelengths; and, acceptable bend performance.

A first aspect of the invention is a single mode optical waveguide fiber having a core region and a clad layer. The core region comprises three segments:

a circular central segment centered on the waveguide long axis;

a first annular segment surrounding the central segment; and, a second annular segment surrounding the first annular segment.

Each segment has a radius, drawn from the waveguide centerline, as defined above, a $\Delta\%$, and a refractive index profile. The second annular segment is also conveniently described in terms of a segment width. In this application $\Delta\%$ is always referenced to the minimum clad index $n_c$.

This first aspect further has an a profile in over the circular central segment in which a in the range of about 0.7 to 2.0. The first annular segment is substantially flat, meaning that at the inner and outer extreme of the segment the refractive index may turn up or down. Also the first annular segment may have a low positive or negative slope without these deviations from flatness causing unacceptable change in the waveguide properties.

The relative index of the central segment, $\Delta_0\%$ is greater than either the relative index of the first or second annular segments, $\Delta_1\%$ and $\Delta_2\%$, respectively, and $\Delta_2\% > \Delta_1\%$.

The profile is further defined by the inner and outer profile volume and the ratio of outer to inner volume. Thus, inner volume is in the range 2.28 to 3.26% $\mu m^2$, the outer profile volume is in the range 3.70 to 13.75% $\mu m^2$, and the ratio of outer to inner volume is in the range 1.5 to 4.3.

In a preferred embodiment, which $\Delta_0\%$ is in the range 1.01% to 1.35%, $\Delta_1\%$ is in the range 0.03% to 0.21%, and $\Delta_2\%$ is in the range 0.12% to 0.61% %. The $\Delta_0\%$ is the modeled value of the $\alpha$ profile before centerline diffusion of the dopant. Diffusion will reduce this relative index value. For example, in the case of a triangular profile, one in which $\alpha=1$, the value of $\Delta_0$ is reduced by an amount in the range of 0.2% to 0.3% when diffusion is taken into account. For convenience, all of the $\Delta_0\%$ values set forth in this specification and in the claims are the relative index values prior to diffusion. The respective radii ranges of the first two segments beginning at the central segment are $r_0$ in the range 2.06 $\mu m$ to 2.80 $\mu m$, $r_1$ in the range 4.55 $\mu m$ to 8.94 $\mu m$, and the width of the second annular segment is $w_2$ in the range 0.01 $\mu m$ to 2.0 $\mu m$.

A refractive index indentation or indent may be present on the waveguide centerline. The indent is at least partially due to diffusion of the dopant species during process steps following deposition of the dopant glass and the base glass. Process steps may be taken to alter, reduce or remove this indent. However, profile modeling and manufacture of developmental waveguides have shown that an indent on center may exist without effecting waveguide performance. In particular, the central profile may have a refractive index indent at the center of the circular segment, the index indent having the approximate shape of an inverted cone, the indent having a minimum relative index in the range of about 0.5% to 0.7% and the radius of the base of the inverted cone shape is no greater than about 0.7 $\mu m$.

The waveguide made in accordance with this first aspect has the advantageous properties, total dispersion over the wavelength range 1530 nm to 1565 nm positive and no greater than 6.5 ps/nm-km, effective area not less than 60 μm², and mode field diameter in the range of 9 μm to 10 μm.

These properties are realized while maintaining cutoff wavelength, measured on waveguide fiber which has been placed in cable form, less than 1470 nm, attenuation at 1550 nm less than 0.22 dB/km, the induced loss under pin array bend testing less than 16 dB, and induced loss under lateral load bend testing less than 0.8 dB/m.

In a second aspect of the invention, the core segment profiles are limited as shown in Table 1 below to provide a set of operating parameters somewhat different from those of the first aspect of the invention. The additional limitations and the resulting change in waveguide parameters are put in place to satisfy an in use requirement, provide for ease of manufacture, for example, by making the waveguide less sensitive to manufacturing variances, or to reduce manufacturing cost.

DETAILS OF THE INVENTION

The use of high performance optical waveguide fiber in the operating window near 1550 nm has greatly increased system capacity while keeping system cost reasonably low. The operating window in the range of about 1530 nm to 1565 nm is of particular interest because this wavelength range is characterized by low waveguide attenuation and is coincident with the bandwidth window of erbium doped waveguide fiber amplifiers.

What has been accomplished in the invention described herein, is the identification of a set of segmented core profiles which meet the requirements of a particular high performance telecommunications system. Further, the requirement set is met without increasing attenuation, while maintaining residual internal waveguide stress relatively low, and while maintaining acceptable bend performance.

Figure 1:
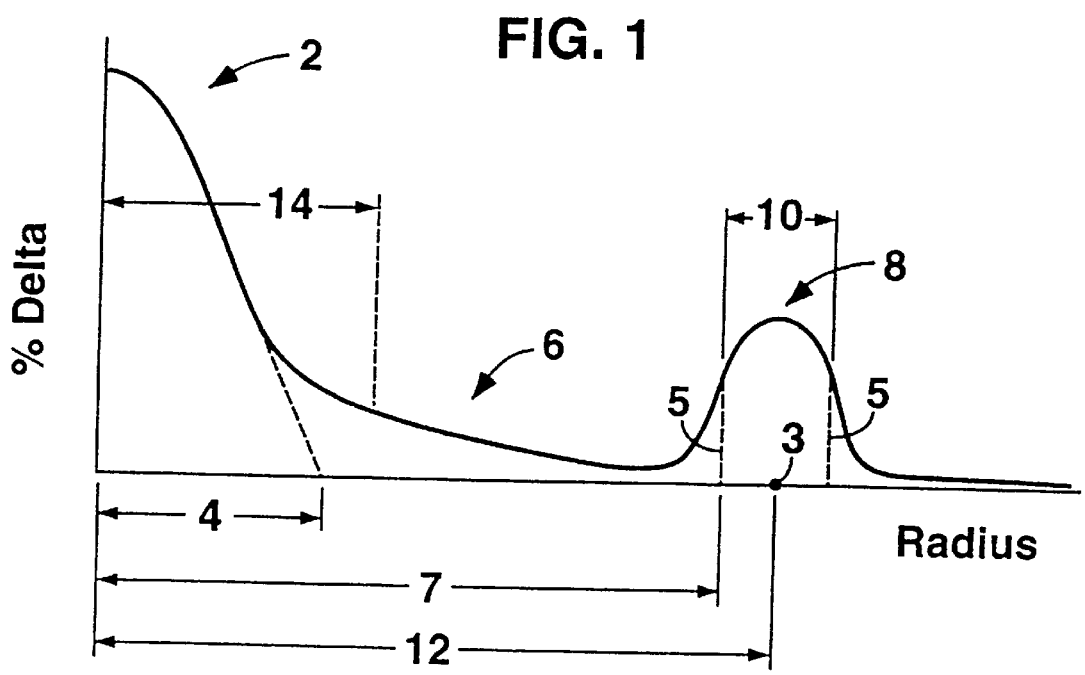
FIG. 1 is a chart of refractive index profile, i.e., a chart of Δ% vs. waveguide radius for an idealized profile in accord with the invention.

The three core segments are indicated as 2, 6, and 8 in FIG. 1. In each segment, the shape of the index profile may take a general shape depending upon radial position. Also the radial extent of each segment may be changed.

As illustration of the definitions given above, the radius of central core region 2 is shown as length 4. In this application the central core radius is measured from the axial centerline to the intersection of the extrapolated central profile with the x axis.

The first annular segment 6 is delimited by the radius 4 and the radius 7, which extends to vertical line 5 drawn from the half index point of the second annular region. The first annular segment has a radius given by radius 7. The characteristic radius of the second annular segment 8 is radius 12, which extends from the core center to the midpoint of the base of segment 8, as indicated by point 3. This convention for second annulus radius is used in all modeled cases. A convenient profile measure for symmetrical profiles is the width 10 shown between vertical lines 5. Lines 5 depend from the half-maximum % delta index points. This convention for second annulus width is used in all modeled cases.

The cross over radius is shown as length 14 in FIG. 1. The profile volume, in units of % delta-microns², inside the cross over radius is the inner profile volume. The profile volume outside the cross over radius is the outer profile volume. The outer to inner volume ratio is a measure of the relative power distribution at a given wavelength and thus is a measure of the effect of a particular index profile change.

Figure 2:
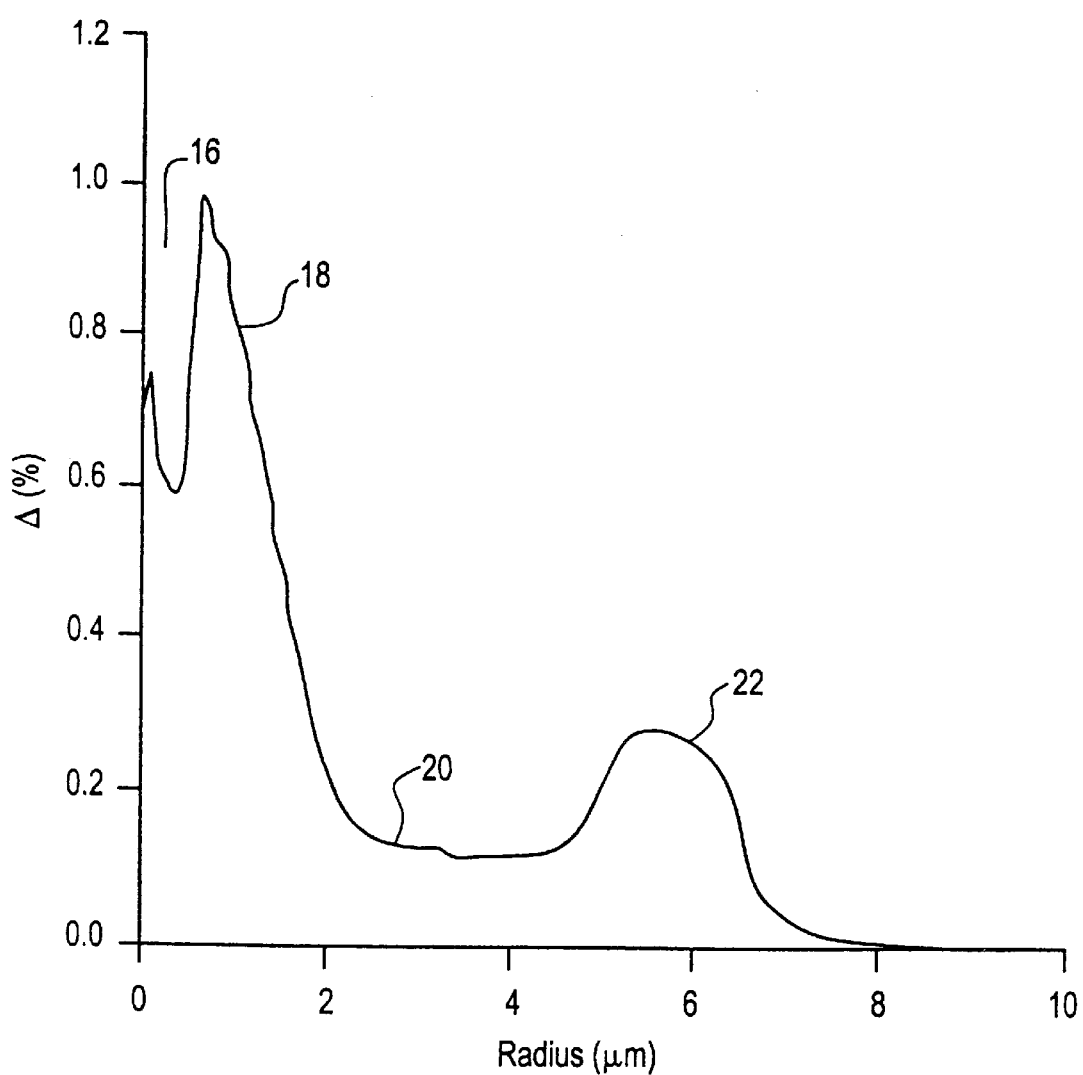
FIG. 2 shows a measurement of Δ% vs. waveguide radius on a typical waveguide made in accord with the invention.

An actual profile made in accord with the invention is shown in FIG. 2. Here the central segment comprises an indent portion 16 and an α profile portion 18. The α for the central segment refractive index profile 18 is essentially 1. The narrowness of this central segment is believed to be essential in achieving the required waveguide parameters, especially the increased effective area as compared to other dispersion shifted waveguide designs. Note that the relative index of the first annular segment 20 is greater than about 0.1 in this example. It is believed that a $\Delta_1\%$ greater than or equal to 0.1 improves attenuation by reducing draw induced defects by reducing glass viscosity mismatch between the central segment and first annular segment during the drawing process. In addition, it is likely that this higher relative index improves bend resistance.

The position, peak value and shape of second annular segment 22, provides for confinement of the propagated light signal and thus maintains acceptable bend performance of the novel waveguide. The remarkable properties of the novel waveguide are given by the modeled results in Table 1.

TABLE 1

| Waveguide Parameter | Embodiment 1 | Embodiment 2 |
| --- | --- | --- |
| 1530 nm Tot. Dispers. (ps · nm-km) | >1 | >0.08 |
| 1565 nm Tot. Dispers. (ps · nm-km) | <5.5 | <6.5 |
| Mode Field Diameter μm | 9–10 | 9–10 |
| Cutoff (cabled) nm | <1360 | <1470 |
| Pin Array Bend dB | <16 | <16 |
| Lateral Load Bend dB/m | <0.8 | <0.8 |
| Att. @ 1550 nm (dB/km) | <0.22 | <0.22 |

Table 2 shows the refractive index structure that provides the waveguide characteristics of Table. 1.

TABLE 2

| Profile Parameter | Embodiment 1 | Embodiment 2 |
| --- | --- | --- |
| $\Delta_0$ % (maximum) | 1.11–1.35 | 1.01–1.35 |
| $\Delta_1$ % (minimum) | 0.03–0.14 | 0.03–0.21 |
| $\Delta_2$ % (maximum) | 0.12–0.50 | 0.12–0.61 |
| $r_0$ μm | 2.06–2.45 | 2.06–2.80 |
| $r_2$ μm | 4.55–6.29 | 4.55–8.94 |
| $w_2$ μm | 0.7–2.0 | 0.01–2.0 |
| Inner Volume % μm² | 2.28–3.00 | 2.28–3.26 |
| Outer Volume % μm² | 3.70–8.12 | 3.70–13.75 |
| Ratio-Outer/Inner | 1.5–2.9 | 1.5–4.3 |

Note that in cases in which higher cutoff wavelength can be tolerated as well as a larger range of dispersion, one may use the wider ranges of embodiment 2. In some uses, the superior properties of embodiment 1 with respect to dispersion may be required. The tables serve to show the sensitivity of the waveguide properties to the profile structure.

It will be understood by those skilled in the art that alternative profile shapes, including step index and trapezoidal index may be used in the three segments in numerous combinations to provide the parameters set forth in Table 1.

Although particular embodiments of the invention have herein been disclosed and described the invention is nonetheless limited only by the following claims.

We claim:

1. A single mode optical waveguide fiber comprising:

a core glass region comprising a first circular central segment, having a relative index $\Delta_0\%$ and a radius $r_0$, a first annular segment surrounding and in contact with the central segment, having a relative index $\Delta_1\%$ and a radius $r_1$, and a second annular segment surrounding and in contact with the first annular segment, having a relative index $\Delta_2\%$, a radius $r_2$, and a width $w_2$, the respective segments each having a refractive index profile;

a clad glass layer having a refractive index profile and a minimum refractive index $n_c$, wherein $n_c$ is the reference index for the relative index of each core segment;

in which the index profile of the central segment is an a profile having $\alpha$ in the range of about 0.7 to 2, the index profile of the first annular segment is substantially flat, the index profile of the second annular segment is a rounded step, and $\Delta_0\% > \Delta_2\% > \Delta_1\%$, the values of the respective $\Delta$'s and radii being chosen so that the inner profile volume is in the range 2.28 to 3.26% $\mu m^2$, the outer profile volume is in the range 3.70 to 13.75% $\mu m^2$ and the ratio of outer to inner volume is in the range 1.5 to 4.3.

2. The single mode waveguide of claim 1 in which $\Delta_0\%$ is in the range 1.01% to 1.35%, $\Delta_1\%$ is in the range 0.03% to 0.21%, and $\Delta_2\%$ is in the range 0.12% to 0.61%.

3. The single mode waveguide of claim 2 in which $r_0$ is in the range 2.06 $\mu m$ to 2.80 $\mu m$, $r_1$ is in the range 4.55 $\mu m$ to 8.94 $\mu m$, and $w_2$ is in the range 0.01 $\mu m$ to 2.0 $\mu m$.

4. The single mode waveguide of claim 1 in which the circular central segment has a refractive index indent at the center of the circular segment, the index indent having the approximate shape of an inverted cone, the indent having a minimum relative index in the range of about 0.5% to 0.7% and the radius of the base of the inverted cone shape is no greater than about 0.7 $\mu m$.

5. The single mode waveguide of claim 1 in which the total dispersion over the wavelength range 1530 nm to 1565 nm is positive and no greater than 6.5 ps/nm-km, the effective area is not less than 60 $\mu m^2$, and mode field diameter is in the range of 9 $\mu m$ to 10 $\mu m$.

6. The single mode waveguide of claim 5 in which the cut off wavelength measured on waveguide fiber which has been placed in cable form is less than 1470 nm, the attenuation at 1550 nm is less than 0.22 dB/km, the induced loss under pin array bend testing is less than 16 dB and the induced loss under lateral load bend testing is less than 0.8 dB/m.

7. A single mode optical waveguide fiber comprising:

a core glass region comprising a first circular central segment, having a relative index $\Delta_0\%$ and a radius $r_0$, a first annular segment surrounding and in contact with the central segment, having a relative index $\Delta_1\%$ and a radius $r_1$, and a second annular segment surrounding and in contact with the first annular segment, having a relative index $\Delta_2\%$, a radius $r_2$, and a width $w_2$, the respective segments each having a refractive index profile;

a clad glass layer having a refractive index profile and a minimum refractive index $n_c$, wherein $n_c$ is the reference index for the relative index of each core segment;

in which the index profile of the central segment is an a profile having $\alpha$ about equal to 1, the index profile of the first annular segment is substantially flat, the index profile of the second annular segment is a rounded step, and $\Delta_0\% > \Delta_2\% > \Delta_1\%$, and, $\Delta_0\%$ is in the range 1.11% to 1.35%, $\Delta_1\%$ is in the range 0.03% to 0.14%, and $\Delta_2\%$ is in the range 0.12% to 0.50%, and, $r_0$ is in the range 2.06 $\mu m$ to 2.45 $\mu m$, $r_1$ is in the range 4.55 $\mu m$ to 6.29 $\mu m$, and $w_2$ is in the range 0.7 $\mu m$ to 2.0 $\mu m$, and the inner profile volume is in the range 2.28 to 3.00% $\mu m^2$, the outer profile volume is in the range 3.70 to 8.12% $\mu m^2$, and the ratio of outer to inner volume is in the range 1.5 to 2.9.

8. The single mode waveguide of claim 7 in which the circular central segment has a refractive index indent at the center of the circular segment, the index indent having the approximate shape of an inverted cone, the indent having a minimum relative index in the range of about 0.5% to 0.7% and the radius of the base of the inverted cone shape is no greater than about 0.7 $\mu m$.

* * * * *